(No Model.) 2 Sheets—Sheet 1.
J. F. MORELL.
ANTI-FRICTION JOURNAL, JOURNAL BOX, AND BEARING.
No. 428,400. Patented May 20, 1890.
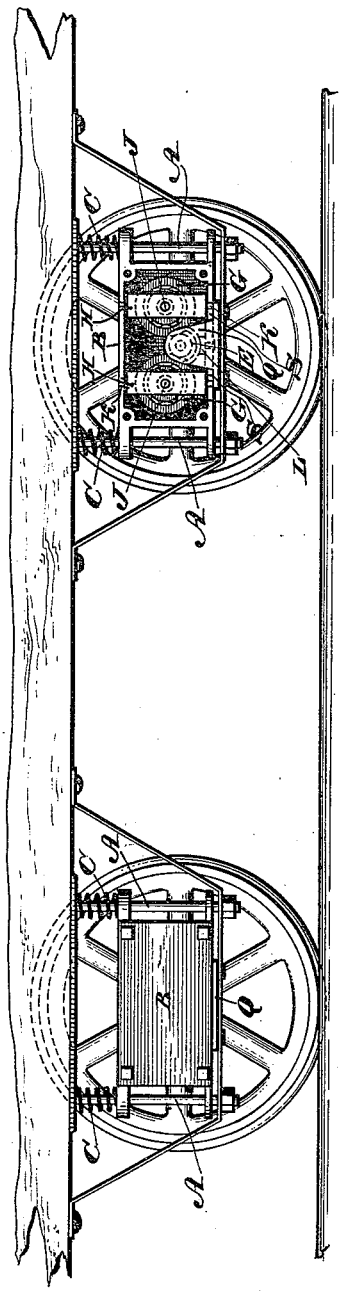
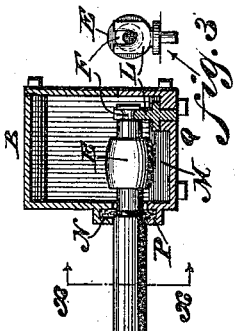
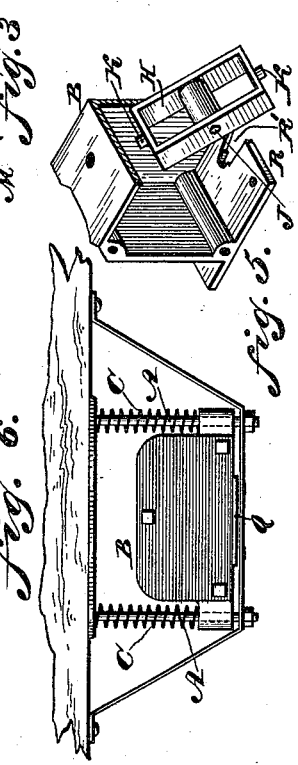
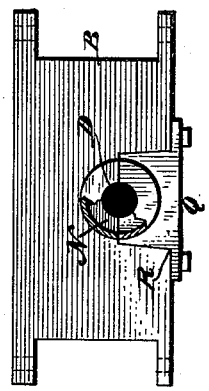
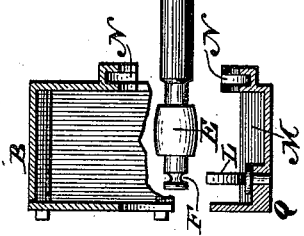
WITNESSES:
L. Douville,
P. F. Nagle
INVENTOR:
James F. Morell
BY John A. Wiederscheim
ATTORNEY.

(No Model.) 2 Sheets—Sheet 2.
J. F. MORELL.
ANTI-FRICTION JOURNAL, JOURNAL BOX, AND BEARING.
No. 428,400. Patented May 20, 1890.
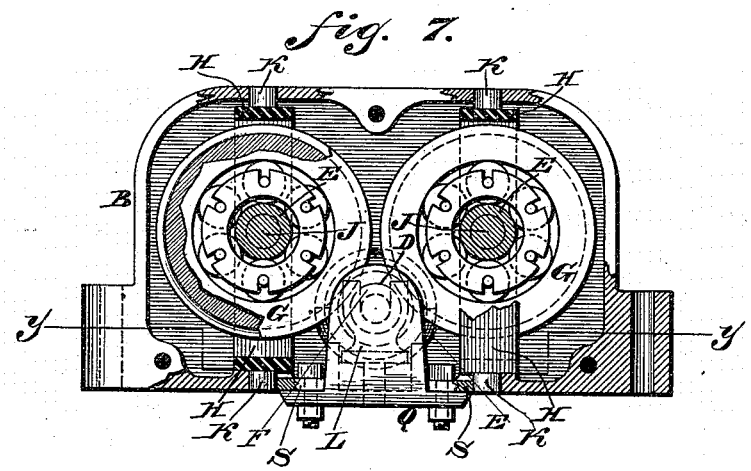
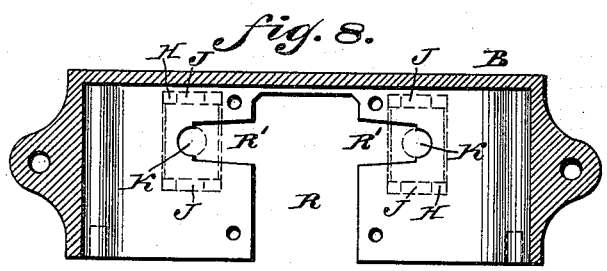
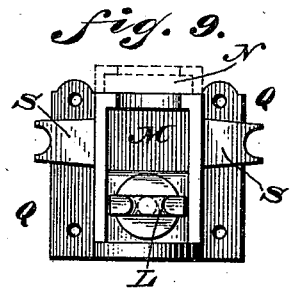
WITNESSES:
L. Douville,
P. F. Nagle.
INVENTOR
James F. Morell
BY John A. Wiederstein
ATTORNEY.

UNITED STATES PATENT OFFICE.

JAMES F. MORELL, OF CAMDEN, NEW JERSEY.

ANTI-FRICTION JOURNAL, JOURNAL BOX, AND BEARING.

SPECIFICATION forming part of Letters Patent No. 428,400, dated May 20, 1890.

Application filed November 5, 1889. Serial No. 329,301. (No model.)

*To all whom it may concern:*

Be it known that I, JAMES F. MORELL, a citizen of the United States, residing in the city and county of Camden, State of New Jersey, have invented a new and useful Improvement in Anti-Friction Journals, Journal Boxes, and Bearings, which improvement is fully set forth in the following specification and accompanying drawings.

My invention consists of an axle or journal which is supported on rollers whose bearings are adapted to swing or turn, and thus conform to the swaying motions of the axle.

It also consists in connecting the axle or journal with the box by means of a stirrup which engages with a neck or shoulder on the axle or journal and swings or turns to conform to the swaying motions of the latter.

It also consists in providing the journal-box with an oil or lubricant receptacle of novel construction.

It also consists of a novel packing-chamber.

It also consists of a novel construction of the box, whereby the bearings of the supporting-rollers of the axle or journal may be readily removed and replaced.

Figure 1 represents a side elevation of journals, journal boxes, and bearings embodying my invention. Fig. 2 represents a vertical section thereof. Fig. 3 represents a side elevation of a stirrup and adjacent portion of the axle or journal. Fig. 4 represents a section on line $x\,x$, Fig. 2. Fig. 5 represents a perspective view of portion of a journal box and bearing of one of the rollers therein. Fig. 6 represents a side elevation of a modification. Fig. 7 represents a partial vertical section and view of the interior of one of the boxes. Fig. 8 represents a horizontal section on line $y\,y$, Fig. 7. Fig. 9 represents a top view of the removable bottom of the box and connected portions.

Similar letters of reference indicate corresponding parts in the several figures.

Referring to the drawings, A designates the pedestals, on which are fitted the journal-boxes B and springs C, which, broadly considered, are of usual construction.

D designates an axle whose journals are located within the boxes B, said journals being formed with heads E and necks F, said heads being in contact with rollers G, which are mounted on swinging bearings H, the latter consisting of frames or plates to which the shafts or axes J of the rollers G are secured, the ends of said plates having vertical journal K projecting therefrom, the same being mounted on the upper and lower walls of the boxes B. The necks F of the journals are freely embraced by swinging stirrups L, which are mounted on the bottoms of the boxes B, they serving to connect the axle D with the boxes B and prevent the same from being wrenched from the boxes, and, furthermore, turning on their axes, so as to conform to the swaying motions of the axle, thus relieving the latter of strain during said motions, it also being seen that the heads E of the journals rotate on the rollers G, thus reducing friction on the journals, the rollers G likewise having their bearings H turn with the swaying motions of the axle, so that the latter is relieved of strain. By these means the axle runs with ease and safety, its friction being reduced and its connection with the boxes reliable.

The bottom of each box is depressed, forming a receptacle M for oil or lubricant, into which dip the heads of the journals or ends of the axle, thus properly lubricating the same.

On the backs or inner sides of the boxes are chambers N, which, formed in sections, receive packing P, the latter embracing the adjacent portions of the axle and closing the opening in the boxes around said axle, thus preventing the loss of the lubricant and the admission of dirt into the boxes.

A portion Q of the bottom of each box is removable, and the remaining portion is centrally recessed at R and laterally recessed, as at R'. The recess R receives the walls of the oil-receptacle M and the stirrup L. The recesses R' receive the arms S, which project laterally from the upper part of the portion Q, it being noticed that the walls of the inner termination of the recesses R' and the outer ends of the arms S are semi-cylindrical, thus forming bearings for the lower journals K of the frames of plates H. (See Figs. 7, 8, and 9.)

Owing to the portions Q of the bottoms of the boxes, the frames or plates H may be readily applied to and removed from the boxes, it being noticed, as in Fig. 5, that when said portions are displaced the upper journals K may be readily fitted in the openings or sockets in the tops of the journal-boxes and the lower journals placed in the end recesses R'. The portions Q are then placed in position and bolted to the stationary part of the bottom, (see Fig. 7,) thus closing the recesses R R'. The arms S now assist to form the bearings of the lower journals K and prevent displacement thereof, it being evident that when the portions Q of the bottom are removed the bearings H may be easily and quickly displaced.

Having thus described my invention, what I claim as new, and desire to secure by Letters Patent, is—

1. An axle or journal bearing consisting of a roller having swinging bearings, substantially as described.

2. An axle or journal bearing consisting of a roller and a frame or plate carrying said roller, said frame or plate having journals which are mounted on the box, substantially as described.

3. An axle or journal bearing having a stirrup which freely embraces said axle or journal and so mounted on the box as to swing or turn with the swaying motions of the axle, substantially as described.

4. A journal-box having a depressed bottom forming an oil or lubricant chamber, into which dips the head of the axle or journal, substantially as described.

5. A journal-box having a depressed bottom and a sectional packing-chamber on the back thereof, combined with an axle or journal having a head E, substantially as described.

6. A journal-box having a recessed bottom, in combination with a plate closing the recess, and having connected arms which, with the stationary part of the bottom, forms the bearings for the supports of the rollers with which the axle or journal is in contact, substantially as described.

7. A journal-box having recesses R R' R² in its bottom, in combination with a closing-plate provided with arms S, whose ends have recesses S', substantially as described.

JAMES F. MORELL.

Witnesses:
JOHN A. WIEDERSHEIM,
WM. C. WIEDERSHEIM.